United States Patent Office 3,010,988
Patented Nov. 28, 1961

3,010,988
PREPARATION OF HALOGENATED ESTERS OF PHOSPHORIC ACIDS
Harold Raffelson, Olivette, Mark E. Mayberry, Affton, and Carroll A. Hochwalt, Clayton, Mo., assignors to Monsanto Chemical Company, St. Louis, Mo., a corporation of Delaware
No Drawing. Filed Dec. 29, 1959, Ser. No. 862,465
19 Claims. (Cl. 260—461)

This invention relates to a novel process for producing halogen-substituted esters of phosphoric acids. More particularly, this invention is concerned with a process comprising the catalyzed reaction of phosphorus oxyhalides and epoxides.

Among the better known compounds produced by said reaction are tris-($\beta$-chloroethyl) phosphate, tris-($\beta$-chloropropyl) phosphate and tris-($\beta$,$\gamma$-dichloropropyl) phosphate. Such compounds are useful as plasticizers, as flame-proofing agents, and as gasoline additives. In this latter capacity, the phosphorus esters act to reduce pre-ignition, autoignition, spark plug fouling and other similar problems which often are caused by harmful engine deposits.

There are several methods disclosed by the prior art for preparing compounds such as tris-($\beta$-chloroethyl) phosphate. One of these involves the reaction of phosphorous oxychloride and ethylene chlorohydrin. Such a process is not commercially practical since the hydrogen chloride which is formed has been found to attack the reaction equipment. Another disadvantage in the process lies in the fact that the aforesaid HCl formation results in a loss of the chlorine during the reaction. A second known method requires the reaction of the same phosphorus compound with ethylene oxide in the presence of a catalyst. The catalysts employed most frequently are aluminum chloride and tin tetrachloride. However, in each instance it was determined that the catalyst precipitated in the reaction mixture and caused the reaction to go out of control. In the case of the aluminum catalyst, it was also found that an insoluble complex formed during the reaction.

The above methods, and their attendant disadvantages, are fully discussed in U.S. Patent 2,610,978, which teaches the reaction of a phosphorus oxyhalide and an oxirane. This reaction is conducted in the presence of either titanium or zirconium tetrachloride as a catalyst. The use of these catalysts present a problem in the recovery of the desired reaction product. At the completion of the reaction it has been found necessary to wash the reaction mixture with a citrate or tartrate solution which forms a complex with the catalyst. The complex was then removed by washing with water followed by drying the remaining product. Another disadvantage encountered employing a titanium or zirconium catalyst resides in the relatively large amounts of the metal halides required.

Accordingly, it is a primary object of this invention to provide a new and improved catalytic process for the preparation of the halogenated triesters of phosphoric acids. It is also an object of this invention to provide a process for the more facile and inexpensive production of such triesters.

More specifically, it is an object of this invention to provide such a process wherein the amount of catalyst employed is substantially reduced, and wherein the catalyst removal has been greatly simplified.

These and still other objects, features and advantages will become apparent from the following detailed description. In accordance with this invention a phosphorus oxyhalide is reacted with an epoxide in the presence of a compound of vanadium. The reaction proceeds smoothly over a substantial temperature range while the catalyst displays no tendency to interfere. Upon completion, the reaction mixture is simply washed with water and dried. The desired triester remains.

Among the phosphorus compounds useful as starting materials in this process are phosphorus oxychloride and phosphorus oxybromide and substituted derivatives thereof. Such derivatives include those where in one or two of the halogen atoms are replaced by a corresponding number of hydrocarbon radicals or halogenated hydrocarbon radicals, said radicals being either directly connected to the phosphorous atom or connected to said atom through an oxygen atom. The aforesaid derivatives also include those phosphorus oxyhalides wherein one or two of the halogens are replaced by an amido radical which may be mono- or di-alkyl substituted. Exemplary phosphorus compounds which may be employed comprise the phosphorus oxy-halides such as phosphorus oxychloride, phosphorus oxybromide and phosphorus oxyfluoride; the mixed oxyhalides such as phosphorus oxydibromide chloride and phosphorus oxydichloride bromide; the alkylated halophosphates such as monoethyl dichlorophosphate, dipropyl bromophosphate, mono-(2-ethylhexyl) dichlorophosphate and didecyl chlorophosphate; the alicyclic halophosphates such as cyclopentyl dichlorophosphate and dicyclohexyl chlorophosphate; the aryl halophosphates such as phenyl dichlorophosphate and diphenyl bromophosphate; the alkaryl halophosphates such as p-ethylphenyl dichlorophosphate and cresyl dichlorophosphate; the haloalkyl and haloaryl halophosphates such as 2-bromoethyl dibromophosphate, di-(2-chloropropyl) chlorophosphate, p-chlorophenyl dichlorophosphate, di-(p-bromophenyl) bromophosphate, and p-chlorophenyl dibromophosphate; the diol halophosphates such as 1,3-butanediol monochlorophosphate, 1,3-hexanediol monochlorophosphate and 1,4-butanediol bis-(dichlorophosphate); the amido and alkyl- and aryl- substituted amido halophosphates such as amidophosphoryl dibromide, N-ethylamidophosphoryl dichloride, N,N-dibutylamidophosphoryl dichloride, N,N-diphenylamidophosphoryl dichloride, and N,N'-diethyldiamidophosphoryl chloride; and other substituted phosphorus oxyhalides such as methoxyethyl dichlorophosphate, ethoxypropyl dichlorophosphate and phenoxyethyl dichlorophosphate. It should also be noted that, where desired, the corresponding halophosphonates may be employed.

The epoxides useful in the process of this invention include those compounds which contain one or more ethylene oxide groups. When at least two of said groups are present, they may be separated by a straight or branched chain radical or by a saturated or unsaturated ring. The selected epoxide may be either symmetrical or unsymmetrical. Illustrative, but not limitative, of the compounds which may be employed are the monoepoxides such as ethylene oxide, propylene oxide, 1,2- and 2,3-butylene oxide, epoxydecane, epoxydodecane, epoxyhexadecane, glycidyl acetate, glycidyl stearate, styrene oxide, stilbene oxide, epichlorohydrin, epibromohydrin, epifluorohydrin, and the like; and the diepoxides such as 2,3,5,6-diepoxydecane, vinyl cyclohexene dioxide, butadiene dioxide, dicyclopentadiene dioxide, 1,4-bis-(2,3-epoxypropoxy) diphenyl ether, 1,3-bis-(2,3-epoxypropoxy) benzene, and the like. The polyepoxides having three or more ethylene oxide groups include those derived from epichlorohydrin and either polyhydric aromatics such as phloroglucinol, tris-(4-hydroxyphenyl) methane, the novolacs, etc., or polyhydric aliphatic alcohols such as glycero, erythritol, sorbitol, etc.

From the expoxides exemplified above, it is preferred to employ those compounds having the structural formula

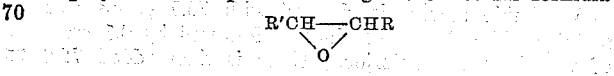

where R and R' may be like or unlike and are selected from hydrogen, alkyl radicals, haloalkyl radicals, aryl radicas and haloaryl radicals.

The essence of this invention resides in the use of a vanadium compound to catalyze the reaction. Representative of the vanadium compounds which may be employed herein are vanadium tribromide, vanadium dichloride, vanadium trichloride, vanadium tetrachloride, vanadium trifluoride, vanadium tetrafluoride, vanadium pentafluoride, vanadyl monobromide, vanadyl dibromide, vanadyl tribromide, vanadyl chloride, vanadyl dichloride, vanadyl trichloride, vanadyl difluoride, vanadyl trifluoride, ammonium metavanadate, calcium metavanadate, copper metavanadate, potassium metavanadate, silver metavanadate, sodium orthovanadate, barium pyrovanadate, lithium metavanadate, vanadium dioxide, vanadium trioxide, vanadium tetraoxide and vanadium pentaoxide. As employed in this application, the terms "vanadium compound" and "compound of vanadium" refer not only to individual compounds themselves but also to mixtures of two or more of such compounds.

The reaction of the process of this invention proceeds according to the following equation which illustrates typical starting materials

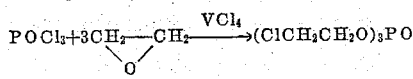

The amount of epoxide employed may in substantial excess of the quantity which would be required by theory to insure that all of the reactive substituents connected to the phosphorus atom by a single bond would react. Such excess may comprise from about 5% up to as much as about 50% of the theoretical amount. However, it should be pointed out that the reaction will proceed readily in the presence of the stoichiometric quantity of epoxide.

In the selection of a particular vanadium catalyst, it is preferred to employ a compound selected from the vanadium halides, the vanadyl halides, the vanadium oxides and the vanadates. In connection with the vanadates, it should be noted that the ortho, meta and pyro forms may be used. The vanadium catalyst is found to be suitable over a fairly wide range of quantities. It has been determined that as little as .01% by weight of the catalyst based upon the weight of the phosphorus starting material will serve to insure reaction. The upper percentage limit of catalyst will be primarily dependent upon practical and economic considerations, amounts up to at least 1% having been found suitable. For most reactions, it is preferred to employ a catalyst concentration of from about .1 to .5% by weight based upon the starting phosphorus material. Both the technical grade and commercially pure grade of the catalytic material work equally well.

In practicing the process of this invention, the phosphorus oxyhalide and the vanadium catalyst are placed in a reactor, and the epoxide is added. While the process is operable at temperatures from about 10 to 100° C., the preferred range varies from about 40° to 70° C. It should be pointed out that while the reaction may be conducted at super-atmospheric pressure such a condition is not a necessary requirement. Upon completion of the reaction the desired phosphorus product is recovered by the simple expedient of washing with water to remove the catalyst and drying the remaining product.

The invention will be more fully understood by reference to the following examples. Such examples, however, are given for the purpose of illustration only and are not to be construed as limiting the scope of the present invention in any way.

*Example I*

A suitable reactor is charged with 76.7 grams (0.5 mole) of phosphorus oxychloride followed by 0.3 gram of vanadium tetrachloride. There is then added 75.0 grams (1.7 moles) of ethylene oxide over a period of about 3½ hours. The mixture is maintained at 60–70° C. during the addition of the epoxide and for about 1 hour thereafter to insure completion of the reaction. The pressure is then reduced to 40 mm. Hg to remove the excess ethylene oxide. The remaining reaction mixture is then washed several times with water to remove the catalyst. The washed product is dried at 100° C./10 mm. Hg. There is obtained 138.0 grams (96.5% of theory) of tris-(β-chloroethyl) phosphate. Analysis shows 10.44% phosphorus and 37.48% chlorine as compared with calculated values of 10.85% phosphorus and 37.25% chlorine.

*Example II*

The procedure of Example I is followed except that the amount of vanadium tetrachloride used is reduced to 0.1 gram, and the temperature during the epoxide addition is maintained at 55–60° C. A yield of 137.6 grams (96.5% of theory) of tris-(β-chloroethyl) phosphate is obtained. The values found are 10.55% phosphorus and 36.72% chlorine as compared with the calculated values cited above.

*Example III*

A suitable reactor is charged with 30.7 grams (0.2 mole) of phosphorus oxychloride followed by 0.3 gram of vanadium tetrachloride. There is then added 39.4 grams (0.67 mole) of propylene oxide over a period of about 2 hours. The mixture is maintained at about 10–15° C. during the epoxide addition and for about 1 hour thereafter to insure completion of the reaction. The excess epoxide is then removed at reduced pressure. The catalyst is then washed out with water, and the remaining product is dried. There is obtained 46.8 grams of tris-(β-chloropropyl) phosphate. Analysis shows 8.61% phosphorus and 29.19% chlorine as compared with calculated values of 9.45% and 32.6% respectively.

*Example IV*

Following the procedure of Example I, the starting materials are 30.7 grams of phosphorus oxychloride, 0.1 gram of vanadium trichloride and 62.0 grams of epichlorohydrin. A yield of 71.7 grams (84% of theory) of tris-(β,γ-dichloropropyl) phosphate is obtained. Analysis shows 7.14% phosphorus and 47.16% chlorine as against calculated values of 7.2% and 49.4% respectively.

*Example V*

A suitable reactor is charged with 30.7 grams of phosphorus oxychloride and 0.01% by weight of vanadium tetrachloride based upon the starting phosphorus compound. Ethylene oxide in the amount of 29.5 grams is added over a period of about 3 hours while the temperature is maintained at about 85–100° C. The reaction mixture is then worked up in the manner of the preceding examples to give tris-(β-chloroethyl) phosphate in good yield.

*Example VI*

In the procedure of Example V, 0.1 gram of vanadium trichloride is substituted for the tetrachloride, and the temperature is maintained at about 45–50° C. during the epoxide addition. There is obtained 55.6 grams (97% of theory) of tris-(β-chloroethyl) phosphate. Analysis shows 10.57% phosphorus and 36.62% chlorine.

*Example VII*

The procedure of Example V is repeated using 0.1 gram of vanadyl dichloride as the catalyst. The temperature is retained at 75–80° C. during addition of the ethylene oxide, and the reaction mixture is worked up as heretofore described. A yield of 50.8 grams (89% of theory) of tris-(β-chloroethyl) phosphate is obtained.

*Example VIII*

A suitable reactor is charged with 23.0 grams of phosphorus oxychloride, followed by 0.1 gram of vanadium trichloride. There is added 61.2 grams (0.51 mole) of styrene oxide over a period of about 1 hour at a temperature of about 50–60° C. Working up of the reaction mixture gives a good yield of tris-(β-phenyl-β-chloroethyl) phosphate. Analysis shows 5.63% phosphorus as against the calculated value of 6.05%.

*Example IX*

In the procedure of Example V, 0.1 gram of vanadyl trichloride is substituted for the tetrachloride, and the temperature is held at about 50–60° C. during addition of the epoxide. There is obtained 54.2 grams (95% of theory) of tris-(β-chloroethyl) phosphate. Analysis shows 10.65% phosphorus and 36.76% chlorine.

*Example X*

Following the procedure set forth in Example V, 0.1 gram of ammonium metavanadate is employed as the catalyst. The temperature during epoxide addition is kept about 40–50° C. Working up in the manner described above yields 54.4 grams of tris-(β-chloroethyl) phosphate. Analysis shows 10.71% phosphorus and 36.84% chlorine.

*Example XI*

A reactor is charged with 30.1 grams (0.105 mole) of phosphorus oxybromide and 0.1 gram of ammonium metavanadate. There is added 16.0 grams (0.36 mole) of ethylene oxide over a period of about 1 hour during which the temperature is maintained at about 60–70° C. After the excess epoxide is removed at reduced pressure, the remaining reaction mixture is washed with water and dried at 90° C./10 mm. Hg. There is obtained tris-(β-bromoethyl) phosphate in good yield.

*Example XII*

A reactor is charged with 37.1 grams (0.15 mole) of 2-ethylhexyl phosphorodichloridate and 0.1 gram of ammonium metavanadate. With the temperature held at about 30–35° C., there is added 15.0 grams (0.34 mole) of ethylene oxide over a period of about 1 hour. The reaction mixture is worked up in the manner described above, and a yield of 46.9 grams (93.5% of theory) of bis-(β-chloroethyl)-2-ethylhexyl phosphate is obtained.

*Example XIII*

A reactor is charged with 33.5 grams (0.2 mole) of chloromethyl phosphonic dichloride and 0.1 gram of calcium metavanadate. This is followed by the addition of 20.0 grams (0.455 mole) of ethylene oxide over a period of about 1 hour while the temperature is held at about 40–50° C. Working up the reaction mixture in the manner previously defined yields 51.1 grams (89% of theory) of chloromethyl-bis-(β-chloroethyl) phosphonate.

*Example XIV*

A reactor is charged with 123.06 grams (0.5 mole) of N-2-ethylhexylamidophosphoryl dichloride and 0.35 gram of vanadium tetrachloride. There is then added 48.5 grams of ethylene oxide over a period of about 3–4 hours while the temperature is maintained at about 60–70° C. The reaction mixture is worked up as in Example I, and di-(β-chloroethyl)-N-(2-ethylhexylamido) phosphate is obtained in good yield.

*Example XV*

A reactor is charged with 15.3 grams (0.1 mole) of phosphorus oxychloride and 0.05 gram of ammonium metavanadate. There is then added 55.2 grams (0.3 mole) of 1,2-epoxydodecane over about 1 hour. The temperature is held at about 65–75° C. during the epoxide addition. The reaction mixture is worked up as above to yield tris-(β-chlorododecyl) phosphate.

*Example XVI*

A reactor is charged with 30.7 grams of phosphorus oxychloride and 0.1 gram of potassium metavanadate. Ethylene oxide in the amount of 29.5 grams is added over about 1 hour while the temperature is maintained at about 55–65° C. Working up the reaction mixture in the manner defined gives tris-(β-chloroethyl) phosphate in the amount of 52.2 grams (92% of theory).

*Example XVII*

A reactor is charged with 30.7 grams of phosphorus oxychloride and 0.1 gram of vanadium tetraoxide. The mixture is heated to about 60° C. Propylene oxide is then added in the amount of 39.4 grams over a period of about 2 hours. The temperature is held at about 60–70° C. during the epoxide addition after which the reaction product is worked up following the procedure of Example V. A yield of 51.7 grams (80% of theory) of tris-(β-chloropropyl) phosphate is obtained. Analysis shows 9.17% phosphorus and 31.65% chlorine as against calculated values of 9.45% and 32.6% respectively.

It is to be understood that, as employed in the preceding description and the ensuing claims, the term "halogen" and the derivatives of said term include chlorine, bromine, fluorine and iodine.

Various modifications and changes may be made in the process described herein, as will be apparent to those skilled in the art to which it pertains, without departing from the spirit and scope of this invention.

What is claimed is:

1. In a process for preparing halogenated esters of phosphoric acids which comprises reacting an epoxide with a halogenated phosphorus compound selected from the class consisting of phosphorus oxyhalides and derivatives of such oxyhalides having from one to two of the halogen atoms substituted by a like number of radicals selected from the group consisting of hydrocarbon radicals and halogenated hydrocarbon radicals directly connected to the phosphorus atom, hydrocarbon radicals and halogenated hydrocarbon radicals connected to the phosphorus atom through an oxygen atom, amido radicals, and mono- and di-alkyl substituted amido radicals, the improvement which comprises carrying out the reaction in the presence of a catalyst selected from the class consisting of vanadium halides, vanadium oxides, vanadates and vanadyl halides.

2. In a process for preparing halogenated esters of phosphoric acids which comprises reacting an epoxide of the formula

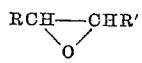

wherein R and R' are selected from the class consisting of hydrogen, alkyl radicals, haloalkyl radicals and phenyl, with a halogenated phosphorus compound selected from the class consisting of phosphorus oxyhalides and derivatives of such oxyhalides having from one to two of the halogen atoms substituted by a like number of radicals selected from the group consisting of hydrocarbon radicals and halogenated hydrocarbon radicals directly connected to the phosphorus atom, hydrocarbon radicals and halogenated hydrocarbon radicals connected to the phosphorus atom through an oxygen atom, amido radicals, and mono- and di-alkyl substituted amido radicals, the improvement which comprises carrying out the reaction in the presence of a catalyst selected from the class consisting of vanadium halides, vanadium oxides, vanadates and vanadyl halides.

3. The process of claim 2 wherein the catalyst is a vanadate.

4. The process of claim 2 wherein the reaction temperature is from about 10 to 100°C.

5. The process of claim 2 wherein the reaction temperature is from about 40 to 70° C.

6. The process of claim 2 wherein the concentration of catalyst is from about 0.01 to 1.0% by weight based upon the weight of the halogenated phosphorus compound.

7. The process of claim 2 wherein the concentration of catalyst is from about 0.1 to 0.5% by weight based upon the weight of the halogenated compound.

8. The process of claim 2 wherein the reaction temperature is from about 10 to 100° C., and the catalyst concentration is from about 0.01 to 1.0% by weight based upon the weight of the halogenated phosphorus compound.

9. The process for preparing halogenated esters of phosphoric acids which comprises reacting ethylene oxide with a phosphorus oxyhalide in the presence of a catalyst selected from the class consisting of vanadium halides, vanadium oxides, vanadates and vanadyl halides.

10. The process of claim 9 wherein the catalyst is a vanadate.

11. The process of claim 9 wherein the reaction temperature is from about 10 to 100° C., and the catalyst concentration is from about 0.01 to 1.0% by weight based upon the weight of the phosphorus oxyhalide.

12. The process of claim 9 wherein the reaction temperature is from about 40 to 70° C., and the catalyst concentration is from about 0.1 to 0.5% by weight based upon the weight of the phosphorus oxyhalide.

13. The process for preparing tris($\beta$-chloroethyl) phosphate which comprises reacting ethylene oxide with phosphorus oxychloride in the presence of a catalyst selected from the class consisting of vanadium halides, vanadium oxides, vanadates and vanadyl halides.

14. The process of claim 13 wherein the reaction temperature is from about 40 to 70° C., and the catalyst concentration is from about 0.1 to 0.5% by weight based upon the weight of the phosphorus oxychloride.

15. The process of claim 13 wherein the catalyst is ammonium metavanadate.

16. The process of claim 13 wherein the catalyst is vanadium trichloride.

17. The process of claim 13 wherein the catalyst is vanadium tetrachloride.

18. The process of claim 13 wherein the catalyst is vanadyl dichloride.

19. The process of claim 13 wherein the catalyst is vanadium tetraoxide.

References Cited in the file of this patent

UNITED STATES PATENTS

| | | |
|---|---|---|
| 2,157,164 | Daly et al. | May 9, 1939 |
| 2,610,978 | Lanham | Sept. 16, 1952 |
| 2,791,574 | Lanham | May 7, 1957 |